United States Patent
Iwamoto et al.

(10) Patent No.: US 12,172,677 B2
(45) Date of Patent: Dec. 24, 2024

(54) DELIVERY SYSTEM, CONTROL METHOD THEREFOR AND NON-TRANSITORY COMPUTER READABLE MEDIUM STORING PROGRAM

(71) Applicant: TOYOTA JIDOSHA KABUSHIKI KAISHA, Toyota Aichi-ken (JP)

(72) Inventors: Kunihiro Iwamoto, Toyota Aichi-ken (JP); Yuta Itozawa, Nagoya Aichi-ken (JP); Hirotaka Komura, Setagaya-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/978,381

(22) Filed: Nov. 1, 2022

(65) Prior Publication Data
US 2023/0146237 A1    May 11, 2023

(30) Foreign Application Priority Data
Nov. 8, 2021 (JP) .................. 2021-181824

(51) Int. Cl.
*B60W 60/00* (2020.01)
*B60P 1/43* (2006.01)
*B60P 3/07* (2006.01)
*G06Q 10/0832* (2023.01)

(52) U.S. Cl.
CPC ......... *B60W 60/00256* (2020.02); *B60P 1/43* (2013.01); *B60P 3/07* (2013.01); *G06Q 10/0832* (2013.01)

(58) Field of Classification Search
CPC ....... B60W 60/00256; B60P 1/43; B60P 3/07; G06Q 10/0832
See application file for complete search history.

(56) References Cited

U.S. PATENT DOCUMENTS 10,948,914 B2 *  3/2021  Xiao ................. G05D 1/0088
2019/0227551 A1  7/2019  Kaisha

FOREIGN PATENT DOCUMENTS

JP    2019-128801 A    8/2019

* cited by examiner

*Primary Examiner* — Huan Le
(74) *Attorney, Agent, or Firm* — Dinsmore & Shohl LLP

(57) ABSTRACT

It is possible to suppress increase in power consumption of a delivery vehicle within a transportation vehicle. A delivery system includes: an autonomously-moving-type delivery vehicle configured to deliver an article; and a transportation vehicle configured to carry and transport the delivery vehicle, in which after the transportation vehicle carrying the delivery vehicle travels toward a delivery destination of the article, the delivery vehicle gets out of the transportation vehicle and delivers the article to the delivery destination. The transportation vehicle includes an unloading mechanism for letting the delivery vehicle get out of the transportation vehicle and a control unit configured to control the unloading mechanism. The delivery vehicle receives a control signal for controlling the unloading mechanism output from the control unit and gets out of the transportation vehicle based on the control signal.

7 Claims, 2 Drawing Sheets

DELIVERY SYSTEM, CONTROL METHOD THEREFOR AND NON-TRANSITORY COMPUTER READABLE MEDIUM STORING PROGRAM

CROSS REFERENCE TO RELATED APPLICATIONS

This application is based upon and claims the benefit of priority from Japanese patent application No. 2021-181824, filed on Nov. 8, 2021, the disclosure of which is incorporated herein in its entirety by reference.

BACKGROUND

The present disclosure relates to a delivery system, a control method therefor, and a control program.

Japanese Unexamined Patent Application Publication No. 2019-128801 discloses a delivery system including an autonomously-moving-type delivery vehicle for delivering an article(s) to the destination of the article(s) to be delivered (hereinafter also referred to as "delivery destination" of the article(s)) and a transportation vehicle for carrying and transporting the delivery vehicle.

SUMMARY

The inventors have found the following problem in the delivery system in which a transportation vehicle that carries therein a delivery vehicle for delivering an article(s) travels to the vicinity of the destination of the article(s) to be delivered (hereinafter also referred to as "delivery destination" of the article(s)), and then the delivery vehicle gets out of the transportation vehicle and delivers the article to the delivery destination.

When a delivery vehicle gets out of a transportation vehicle, the delivery vehicle needs to detect the operation of the unloading mechanism of the transportation vehicle and therefore moves around and performs sensing inside the transportation vehicle, which leads to a problem that the power consumption of the delivery vehicle within the transportation vehicle increases.

The present disclosure has been made in view of the above-described circumstances, and an object thereof is to provide a delivery system in which increase in the power consumption of a delivery vehicle within a transportation vehicle can be suppressed.

A first exemplary aspect is a delivery system including:
an autonomously-moving-type delivery vehicle configured to deliver an article; and
a transportation vehicle configured to carry and transport the delivery vehicle, in which
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle and a control unit configured to control the unloading mechanism, and
the delivery vehicle receives a control signal for controlling the unloading mechanism output from the control unit and gets out of the transportation vehicle based on the control signal.

Further, another exemplary aspect is a control method for a delivery system that includes:
an autonomously-moving-type delivery vehicle configured to deliver an article; and
a transportation vehicle configured to carry and transport the delivery vehicle, in which
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle, and
the delivery vehicle receives a control signal for controlling the unloading mechanism and gets out of the transportation vehicle based on the control signal.

Further, another exemplary aspect is a control program for a delivery system that includes:
an autonomously-moving-type delivery vehicle configured to deliver an article; and
a transportation vehicle configured to carry and transport the delivery vehicle, wherein
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle, and
the control program causes the delivery vehicle to receive a control signal for controlling the unloading mechanism and get out of the transportation vehicle based on the control signal.

As described above, according to an aspect of the present disclosure, a transportation vehicle includes an unloading mechanism for letting a delivery vehicle get out of the transportation vehicle and a control unit configured to control the unloading mechanism, and the delivery vehicle receives a control signal for controlling the unloading mechanism from the control unit and gets out of the transportation vehicle based on the control signal.

Therefore, since the operation of the unloading mechanism of the transportation vehicle is detected when a delivery vehicle gets out of a transportation vehicle, the delivery vehicle does not need to move around and perform sensing inside the transportation vehicle. As a result, it is possible to suppress increase in power consumption of a delivery vehicle within a transportation vehicle.

The unloading mechanism may include an opening/closing door that opens when the delivery vehicle gets out of the transportation vehicle. Here, when the delivery vehicle gets out of the transportation vehicle, the opening/closing door may function as a slope extending from the inside of the transportation vehicle to the ground surface. The above-described configuration allows for simplification of the unloading mechanism.

According to the present disclosure, it is possible to provide a delivery system in which increase in the power consumption of a delivery vehicle within a transportation vehicle can be suppressed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
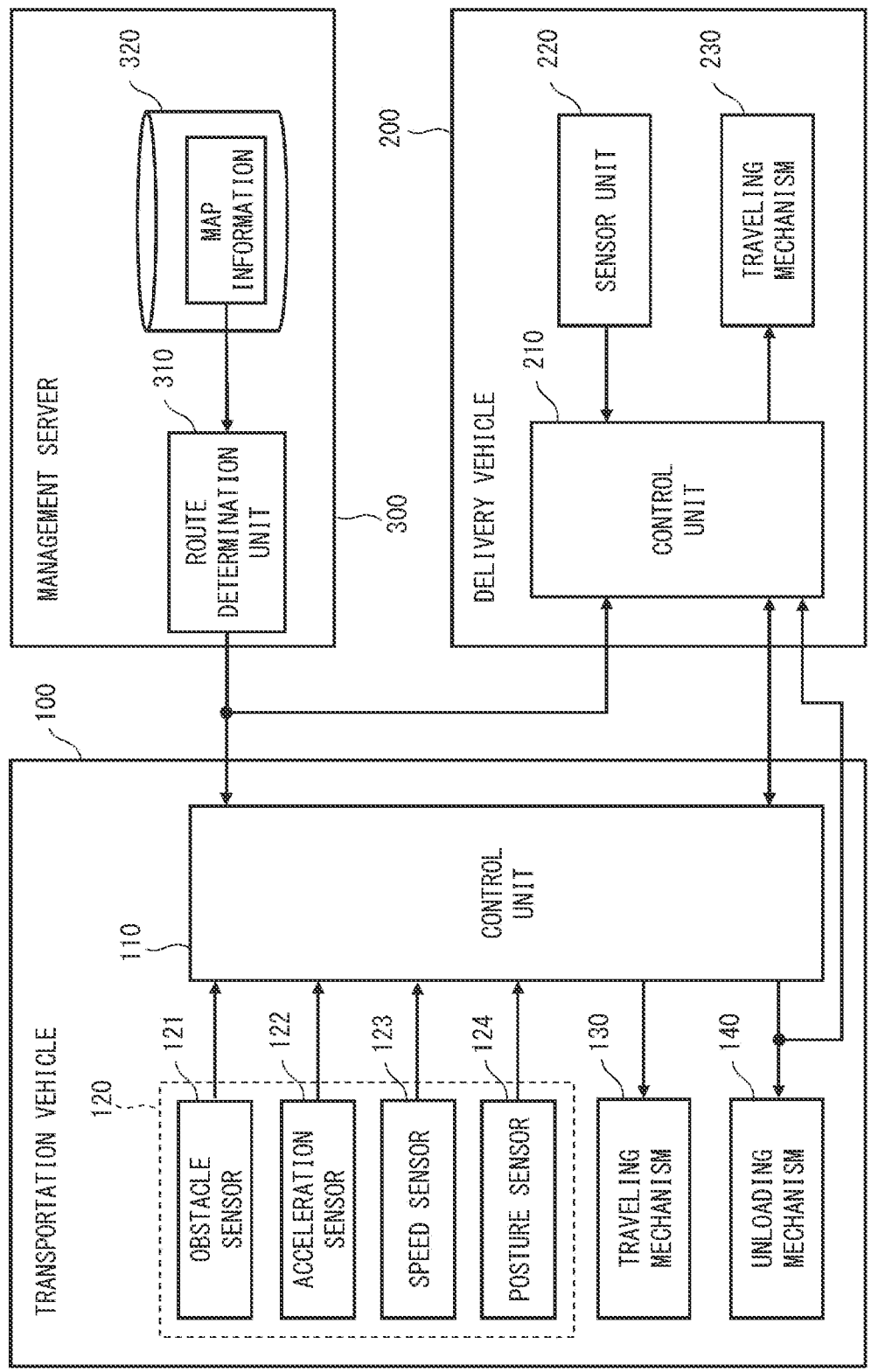
FIG. 1 is a block diagram of a delivery system according to a first embodiment.

Specific embodiments will be described hereinafter in detail with reference to the drawings. The same or corresponding elements are denoted by the same reference numerals (or symbols) throughout the drawings, and redundant descriptions thereof are omitted as required for clarifying the explanation.

First Embodiment

<Configuration of Delivery System>

Firstly, a delivery system and a delivery method according to a first embodiment will be described with reference to FIG. 1. FIG. 1 is a block diagram of a delivery system according to the first embodiment. As shown in FIG. 1, the delivery system according to this embodiment includes a transportation vehicle 100, a delivery vehicle 200, and a management server 300.

After the transportation vehicle 100 carrying the delivery vehicle 200 travels toward the delivery destination of an article(s), the delivery vehicle 200 gets out of the transportation vehicle 100 and delivers the article(s) to the delivery destination.

Firstly, the transportation vehicle 100 will be described.

The transportation vehicle 100 carries and transports the delivery vehicle 200. Although the transportation vehicle 100 in this embodiment is an autonomously-moving-type vehicle (i.e., a self-driving vehicle), the transportation vehicle 100 may be a vehicle driven by a human driver. As shown in FIG. 1, the transportation vehicle 100 includes a control unit 110, a sensor unit 120, a traveling mechanism 130, and an unloading mechanism 140. Further, the transportation vehicle 100 is wirelessly connected to the delivery vehicle 200 and the management server 300 so as to be able to communicate with them.

Note that when the management server 300 is disposed in the transportation vehicle 100, the transportation vehicle 100 may be connected to the management server 300 through a cable(s). Further, although the transportation vehicle 100 is carrying only one delivery vehicle 200 in the example shown in FIG. 1, the transportation vehicle 100 may carry a plurality of delivery vehicles 200.

The control unit 110 controls the traveling mechanism 130 based on various types of information acquired from the sensor unit 120. In this way, the transportation vehicle 100 travels autonomously. Further, the control unit 110 controls the unloading mechanism 140 for letting the delivery vehicle 200 get out of the transportation vehicle 100.

The control unit 110 includes, for example, an arithmetic unit such as a CPU (Central Processing Unit), and a storage unit such as a RAM (Random Access Memory) and a ROM (Read Only Memory) in which various types of control programs, data, and the like are stored. That is, the control unit 110 has a function as a computer, and controls the traveling mechanism 130 and the unloading mechanism 140 based on the aforementioned various types of control programs and the like.

In the example shown in FIG. 1, the sensor unit 120 includes an obstacle sensor 121, an acceleration sensor 122, a speed sensor 123, and a posture sensor 124.

The obstacle sensor 121 detects an obstacle ahead of the transportation vehicle 100 in the traveling direction thereof. Further, the obstacle sensor 121 detects an obstacle at the time when the delivery vehicle 200 gets out of the transportation vehicle 100. The obstacle sensor 121 is, for example, a radar sensor, a sonar sensor, an ultrasonic sensor, a LiDAR sensor, a camera, or the like. Examples of the obstacle are not limited to other vehicles and objects on the road that have accidentally fallen from other vehicles, and include humans such as pedestrians, animals, and so on.

The acceleration sensor 122 detects the acceleration of the transportation vehicle 100. It is possible to detect vibrations of the transportation vehicle 100 caused by irregularities (roughness) or the like on the road surface by detecting the acceleration of the transportation vehicle 100.

The speed sensor 123 detects the speed of the transportation vehicle 100.

The posture sensor 124 detects the posture of the transportation vehicle 100. It is possible to detect the gradient of the road on which the transportation vehicle 100 is traveling by the posture sensor 124.

The traveling mechanism 130 is a mechanism for moving the transportation vehicle 100 (i.e., making the transportation vehicle 100 travel). For example, the traveling mechanism 130 includes, in addition to the driving mechanism, such as a motor or an engine, for moving the transportation vehicle 100, a braking mechanism for stopping the transportation vehicle 100, and a steering mechanism for making the transportation vehicle 100 turn (i.e., making the transportation vehicle 100 change its traveling direction).

Figure 2:
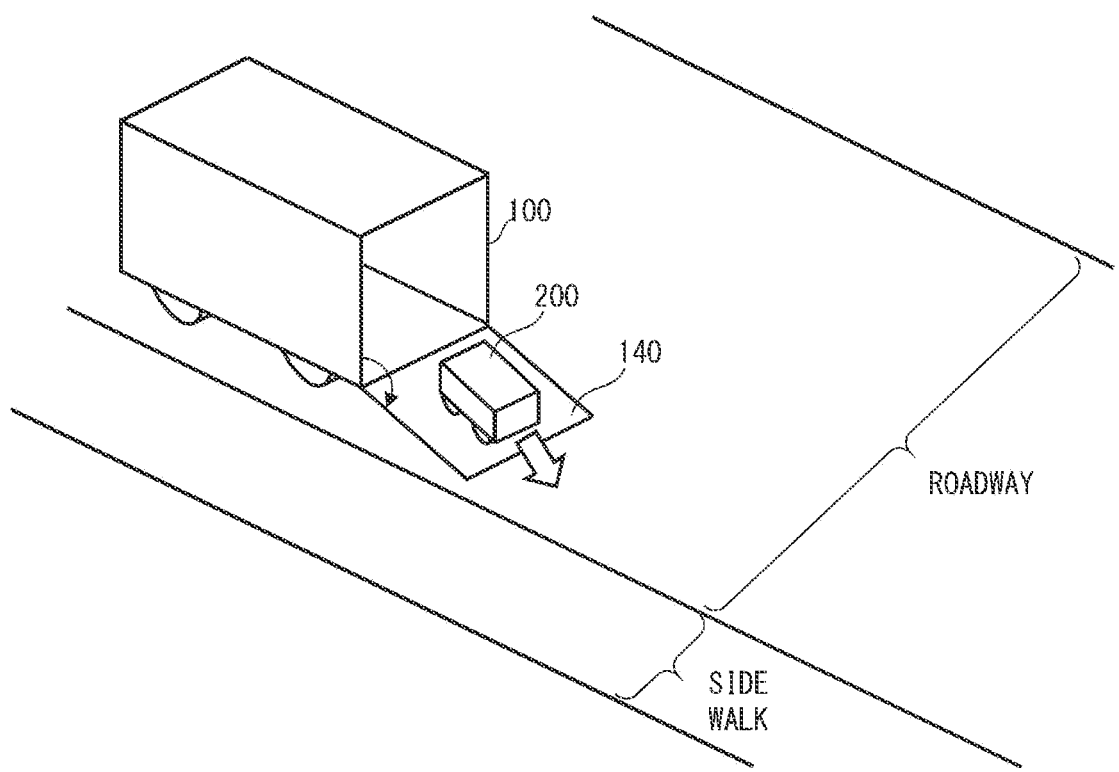
FIG. 2 is a perspective view showing the state in which a delivery vehicle 200 gets out of a transportation vehicle 100 in the delivery system according to the first embodiment.
Figure 3:
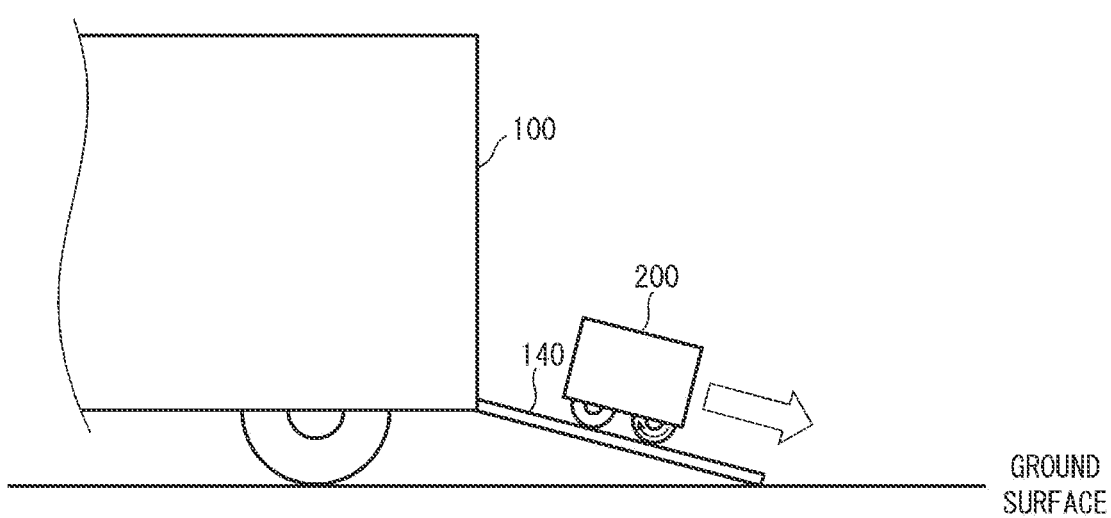
FIG. 3 is a side view showing the state in which the delivery vehicle 200 gets out of the transportation vehicle 100 in the delivery system according to the first embodiment.

The unloading mechanism 140 is a mechanism for letting the delivery vehicle 200 get out of the transportation vehicle 100. Next, an example of the unloading mechanism 140 will be described with reference to FIGS. 2 and 3. FIG. 2 is a perspective view showing a state in which the delivery vehicle 200 gets out of the transportation vehicle 100. FIG. 3 is a side view showing the state in which the delivery vehicle 200 gets out of the transportation vehicle 100.

As shown in FIGS. 2 and 3, the unloading mechanism 140 according to this embodiment is a simple plate-like slope. In the example shown in FIGS. 2 and 3, the unloading mechanism 140 also functions as an opening/closing door provided in the rear part of the transportation vehicle 100. The unloading mechanism 140 is connected to one side (e.g., a side at the lower edge) of the opening provided in the rear part of the transportation vehicle 100. In the normal state, the unloading mechanism 140 serves as an opening/closing door and is closed. However, when the delivery vehicle 200 gets out of the transportation vehicle 100, the unloading mechanism 140, which serves as the opening/closing door, is opened and functions as a slope extending from the inside of the transportation vehicle 100 to the ground surface.

For example, when the delivery vehicle 200 gets out of the transportation vehicle 100 to deliver an article(s), the control unit 110 of the transportation vehicle 100 outputs a control signal for controlling the unloading mechanism 140 as shown in FIG. 1. Then, the control unit 210 of the delivery vehicle 200 receives the control signal output from the control unit 110 of the transportation vehicle 100. Based on the control signal, the delivery vehicle 200 gets out of the transportation vehicle 100.

Specifically, as shown in FIGS. 2 and 3, the control unit 110 opens the unloading mechanism 140, which functions as the opening/closing door, and have the unloading mechanism 140 function as a slope extending from the inside of the transportation vehicle 100 to the ground surface. Then, as shown in FIGS. 2 and 3, the delivery vehicle 200 travels on the unloading mechanism 140 and thereby gets down onto the roadway. Further, the delivery vehicle 200 delivers the article(s) to the delivery destination, for example, by traveling from the roadway to the sidewalk and to the delivery destination.

Note that the unloading mechanism 140 may have the opening/closing door and the slope disposed separately. In such a case, the unloading mechanism 140 is housed, for example, under the floor of the transportation vehicle 100.

Further, the unloading mechanism 140 shown in FIGS. 2 and 3 is just an example, and the mechanism is not limited to any particular mechanism as long as it can let the delivery vehicle 200 get out of the transportation vehicle 100. Further, the opening/closing door provided to the unloading mechanism 140 includes a shutter, a blocking bar, and the like.

Next, the delivery vehicle 200 will be described.

The delivery vehicle 200 is an autonomously-moving-type vehicle which, after being transported by the transportation vehicle 100, gets out of the transportation vehicle 100 and delivers an article(s) to the delivery destination thereof. As shown in FIG. 1, the delivery vehicle 200 includes a control unit 210, a sensor unit 220, and a traveling mechanism 230. Further, the delivery vehicle 200 is wirelessly connected to the transportation vehicle 100 and the management server 300 so as to be able to communicate with them. Note that when the management server 300 is disposed in the delivery vehicle 200, the delivery vehicle 200 may be connected to the management server 300 through a cable(s).

The control unit 210 controls the traveling mechanism 230 based on various types of information acquired from the sensor unit 220. That is, the delivery vehicle 200 travels autonomously as the control unit 210 controls the traveling mechanism 230. Note that, similarly to the sensor unit 120 of the transportation vehicle 100, the sensor unit 220 includes various types of sensors.

Similarly to the control unit 110 of the transportation vehicle 100, the control unit 210 includes an arithmetic unit such as a CPU, and a storage unit such as a RAM and a ROM in which various types of control programs, data, and the like are stored. That is, the control unit 210 has a function as a computer, and controls the traveling mechanism 230 based on the aforementioned various types of control programs and the like.

Further, as described above, the control unit 210 receives a control signal for controlling the unloading mechanism 140 output from the control unit 110 of the transportation vehicle 100. The delivery vehicle 200 can recognize the operation of the unloading mechanism 140 based on the control signal. Then, based on the control signal, the delivery vehicle 200 gets out of the transportation vehicle 100.

Note that the control unit 210 does not need to receive the control signal output from the control unit 110 directly from the control unit 110 and may instead receive it through, for example the management server 300.

For example, the control unit 210 may shift from the sleep mode or the suspend mode to the normal mode based on the aforementioned control signal and recognize the operation of the unloading mechanism 140, and then determine the timing to get out of the transportation vehicle 100. Here, the operation of the unloading mechanism 140 includes, for example, the unlocking operation of the opening/closing door provided to the unloading mechanism 140.

In the delivery system according to this embodiment, since the operation of the unloading mechanism 140 is detected when the delivery vehicle 200 gets out of the transportation vehicle 100, the delivery vehicle 200 does not need to move around and perform sensing inside the transportation vehicle 100. Therefore, it is possible to suppress increase in power consumption of the delivery vehicle 200 within the transportation vehicle 100.

The traveling mechanism 230 is a mechanism for moving the delivery vehicle 200 (i.e., making the delivery vehicle 200 travel). For example, the traveling mechanism 230 includes, in addition to the driving mechanism, such as a motor or an engine, for moving the delivery vehicle 200, a braking mechanism for stopping the delivery vehicle 200, and a steering mechanism for making the delivery vehicle 200 turn (i.e., making the delivery vehicle 200 change the traveling direction).

Next, the management server 300 will be described.

The management server 300 is a server for communicating with the transportation vehicle 100 and the delivery vehicle 200 and managing the delivery system. The management server 300 is, for example, a cloud server. As shown in FIG. 1, the management server 300 includes a route determination unit 310 and a storage unit 320.

The route determination unit 310 is configured of, for example, an arithmetic unit such as a CPU and the like. As shown in FIG. 1 the route determination unit 310 determines the delivery route from the current location of the transportation vehicle 100 to the delivery destination based on the map information stored in the storage unit 320. Then, the route determination unit 310 transmits the determined delivery route to the control unit 110 of the transportation vehicle 100 and the control unit 210 of the delivery vehicle 200. Further, the map information may include road-surface information.

The storage unit 320 is configured of, for example, RAM, ROM, and the like, and stores various control programs and data in addition to the map information.

That is, the management server 300 has a function as a computer, and manages the delivery system based on the aforementioned various types of control programs and the like.

As described above, according to the delivery system according to this embodiment, while the transportation vehicle 100 is traveling, the control unit 110 determines whether or not the delivery vehicle 200 can get out of the transportation vehicle 100 based on the situation of the transportation vehicle 100. Then, only when the control unit 110 has determined that the delivery vehicle 200 can get out of the transportation vehicle 100, the control unit 110 controls the unloading mechanism 140 so as to let the delivery vehicle 200 get out of the transportation vehicle 100.

As described above, in the delivery system according to this embodiment, the control unit 210 of the delivery vehicle 200 receives a control signal for controlling the unloading mechanism 140 output from the control unit 110 of the transportation vehicle 100. Then, based on the control signal, the delivery vehicle 200 gets out of the transportation vehicle 100.

In the delivery system according to this embodiment, since the operation of the unloading mechanism 140 is detected when the delivery vehicle 200 gets out of the transportation vehicle 100, the delivery vehicle 200 does not need to move around and perform sensing inside the transportation vehicle 100. Therefore, it is possible to suppress increase in power consumption of the delivery vehicle 200 within the transportation vehicle 100.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The present disclosure is not limited to the above-described embodiments, and various modifications can be made without departing from the spirit and scope of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system comprising:
an autonomously-moving-type delivery vehicle configured to deliver an article; and
a transportation vehicle configured to carry and transport the delivery vehicle, wherein
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle and a control unit configured to control the unloading mechanism,
the control unit determines whether the delivery vehicle can get out of the transportation vehicle based on a situation of the transportation vehicle,
upon determination that the delivery vehicle can get out of the transportation vehicle, the control unit controls the unloading mechanism so as to let the delivery vehicle get out of the transportation vehicle, and transmits a control signal to the delivery vehicle, and
the delivery vehicle receives the control signal and gets out of the transportation vehicle based on the control signal.

2. The delivery system according to claim 1, wherein the unloading mechanism includes an opening/closing door that opens when the delivery vehicle gets out of the transportation vehicle.

3. The delivery system according to claim 2, wherein when the delivery vehicle gets out of the transportation vehicle, the opening/closing door functions as a slope extending from the inside of the transportation vehicle to a ground surface.

4. A control method for a delivery system that comprises:
an autonomously-moving-type delivery vehicle configured to deliver an article; and
a transportation vehicle configured to carry and transport the delivery vehicle, wherein
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle,
the transportation vehicle determines whether the delivery vehicle can get out of the transportation vehicle based on a situation of the transportation vehicle,
upon determination that the delivery vehicle can get out of the transportation vehicle, the transportation vehicle controls the unloading mechanism so as to let the delivery vehicle get out of the transportation vehicle, and transmits a control signal to the delivery vehicle, and
the delivery vehicle receives the control signal and gets out of the transportation vehicle based on the control signal.

5. The control method for the delivery system according to claim 4, wherein the unloading mechanism includes an opening/closing door that opens when the delivery vehicle gets out of the transportation vehicle.

6. The control method for the delivery system according to claim 5, wherein when the delivery vehicle gets out of the transportation vehicle, the opening/closing door functions as a slope extending from the inside of the transportation vehicle to a ground surface.

7. A non-transitory computer readable medium storing a control program for a delivery system that comprises:
an autonomously-moving-type delivery vehicle configured to deliver an article; and
a transportation vehicle configured to carry and transport the delivery vehicle, wherein
the delivery system is configured so that after the transportation vehicle carrying the delivery vehicle travels toward a delivery destination of the article, the delivery vehicle gets out of the transportation vehicle and delivers the article to the delivery destination,
the transportation vehicle includes an unloading mechanism for letting the delivery vehicle get out of the transportation vehicle,
the transportation vehicle determines whether the delivery vehicle can get out of the transportation vehicle based on a situation of the transportation vehicle,
upon determination that the delivery vehicle can get out of the transportation vehicle, the transportation vehicle controls the unloading mechanism so as to let the delivery vehicle get out of the transportation vehicle, and transmits a control signal to the delivery vehicle, and the control program causes the delivery vehicle to receive the control signal and get out of the transportation vehicle based on the control signal.

* * * * *